United States Patent [19]

Lermuzeaux

[11] Patent Number: 4,924,600
[45] Date of Patent: May 15, 1990

[54] FLUIDIZATION TREATMENT PROCESS AND INSTALLATION

[75] Inventor: André Lermuzeaux, Sucy-en-Brie, France

[73] Assignee: L'Air Liquide, Paris, France

[21] Appl. No.: 119,953

[22] Filed: Nov. 13, 1987

[30] Foreign Application Priority Data

Nov. 21, 1986 [FR] France .............................. 86 16220

[51] Int. Cl.[5] .............................................. F26B 3/08
[52] U.S. Cl. .......................................... 34/10; 34/57 A
[58] Field of Search .................... 34/57 R, 57 A, 57 B, 34/57 C, 10

[56] References Cited

U.S. PATENT DOCUMENTS 4,115,929  9/1978  Staub et al. .............................. 34/10
4,443,419  4/1984  Carson .
4,637,266  1/1987  Greenwood .......................... 34/10 X

FOREIGN PATENT DOCUMENTS 953735  10/1947  France .
53-16366  2/1978  Japan .
884346  12/1961  United Kingdom .

Primary Examiner—Henry A. Bennet
Attorney, Agent, or Firm—Lee C. Robinson, Jr.

[57] ABSTRACT

A system for fluidizing products in the form of grains or pieces. Gas is injected through lateral inlet ports in facing relation to each other in pairs so as to form an ascending current for a fluidized bed and a descending current for a fixed bed from which the treated product may be withdrawn by a belt. The system is particularly applicable to the deep freezing of food, drying, transfer of masses, gasification, etc.

17 Claims, 6 Drawing Sheets

FLUIDIZATION TREATMENT PROCESS AND INSTALLATION

The present invention relates to the treatment of a product in the state subdivided into particulate elements or grains, of the type in which there is employed a bed of said particulate elements fluidized by a fluidization gas in a chamber open in the upper part with injection of a fluidization gas Generally, the fluidization is achieved by injection of gas through an aperture sole plate or grate adapted to support the fluidized bed formed. In a good number of applications, this manner of creating the fluidization has drawbacks and in particular it is not rare that some orifices of the sole plate become clogged by the jamming of grains or the formation of clusters or grains, as is the case in deep freezing in which this clustering may result from the existence of residual humidity on the surface of the grains. Serious disturbances of the operation of the fluidized bed result.

An object of the invention is to provide a fluidized bed which has a stable operation, and an installation which remains compact for a large treated output.

According to the invention, the gas is injected through lateral inlet ports which are in facing relation to each other and located at a distance from a chamber bottom so as to form at least two currents which are convergent toward each other and form, on one hand, an ascending principal recomposition current for the fluidization of said particulate elements, and, on the other hand, a descending auxiliary recomposition current flowing through a substantially fixed bed of said particulate elements forming a support for said fluidized bed and escaping from the chamber through an opening in a low position.

More specifically, there is effected a continuous supply of particulate elements to be treated at the level of the fluidized bed and a continuous withdrawal of treated particulate elements at the low level of the fixed bed. Further, it is advantageous for the maintenance of a substantially constant level of the fluidized bed, to arrange that the rate of withdrawal of the treated product is governed by the pressure of injection of the gas or the product level in the fluidized bed, or generally the rate of supply of the product.

As a preferred application, the invention concerns a process for cooling a product, for example the deep freezing of food products in the form of grains or pieces, of the type in which, with the treating chamber placed in a thermal insulating enclosure, the gas escaping from the top of the fluidized bed and at the bottom of the fixed bed is recirculated, in said enclosure, to said injection ports, while adding to the recirculation gas a cryogenic agent, for example in the form of sprayed liquid nitrogen or carbon dioxide snow.

In this way, owing to the lateral disposition of the inlet ports, a fluidization is achieved with no risk of occlusion of the inlet ports.

The invention also relates to an installation for treating a product in the subdivided state, of the type comprising a chamber having vertical walls and wide open at its upper end, and provided with fluidization gas injecting orifices, wherein the gas injection orifices are lateral inlet ports provided at a distance from the chamber bottom and in facing relation to each other in pairs; preferably, the chamber includes a gas discharge opening in a low position. Advantageously, the chamber is provided, at its lower end, with means for withdrawing treated product and, above the inlet ports, with means for supplying product to be treated.

The features and advantages of the invention will be apparent from the following description which is given by way of example with reference to the accompanying drawings, in which.

Figure 1:
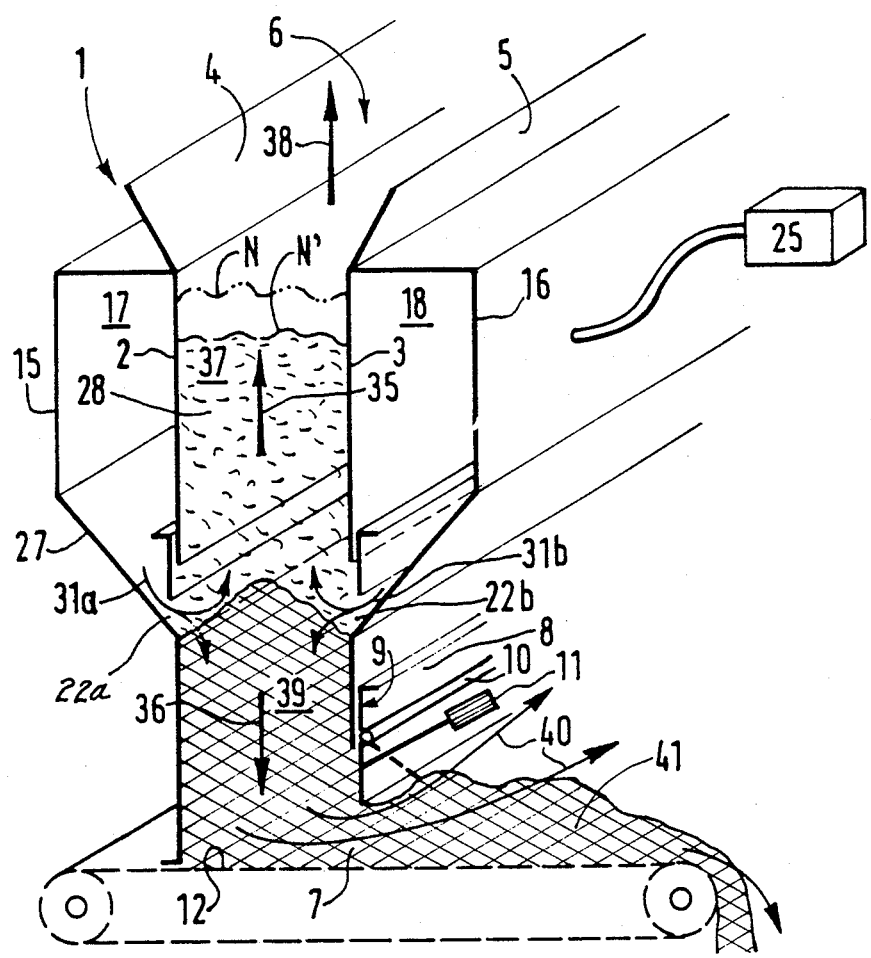
FIG. 1 is a diagrammatic, vertical, sectional and isometric view of a treating chamber according to the invention.

With reference to FIG. 1, an installation for treating a product in the state subdivided into particulate elements or grains, comprises a chamber 1 having a parallelepipedic shape with vertical walls, two walls 2 and 3 of which are represented and form longitudinal walls, while the end walls (not shown) form transverse walls. The lateral walls are extended at their upper end by outwardly divergent walls 4 and 5 constituting a hopper 6 supplying product to be treated.

Provided at the lower end of the lateral wall 3 is a longitudinal withdrawal passage 7 more or less closed by a withdrawal door 8 which is mounted to be both adjustably vertically slidable at 9 and pivotable in its lower part outwardly about a longitudinal shaft 10 against the action of a counterweight 11.

An extraction conveyor belt 12 for the treated product in the form of grains is arranged below the chamber 1.

The chamber 1 forms with two opposed lateral walls 2, 3 or longitudinal walls, and external walls 15, 16 two collectors 17, 18 supplying gas under pressure, and these two collectors 17, 18 communicate through longitudinal slots or ports 22a and 22b provided roughly midway of the height of the walls 2, 3, with the chamber 1, the ports 22a and 22b being at the same level and in facing relation to each other.

The slots 22a and 22b are adjustable in their vertical dimension so that, for a given gas flow rate, it is possible to regulate the rate of introduction of the gas into the chamber 1 at the level of the slots.

The walls 27 which form the bottom of the two collectors 17 and 18 have a slope of 45° to 30° relative to the vertical plane so that the fine particles entrained in the fluidization gas current cannot accumulate thereon but are, on the contrary, reintroduced through the slots into the fluidized bed; the gas circuit which leads to the collectors 17 and 18 has a direction descending toward the slots 22a and 22b and such section that the velocity of the gas does not permit the deposit of small particles and it is ensured that they are reintroduced into the fluidized bed.

In operation, with the collectors 17 and 18 put under gas pressure, two currents 31a and 31b are injected towards each other through the slots 22a and 22b; they are recomposed to form vertical currents having an ascending part 35 and a descending part 36.

The ascending current 35 produces the fluidization of the upper mass of grains 28 and forms a fluidized bed 27 and escapes from the chamber 1 through the hopper 6 in a current 38, while the descending current 36 flows through the grains maintained in mutual contact in a fixed bed 39, the descending current escaping to the exterior at 40 through a heap 41 of product formed on the extracting belt 12.

A supply of product to be treated is tipped preferably in a continuous manner into the hopper 6 for the purpose of feeding the fluidized bed 37, while the treated product flows from the fixed bed 39. To ensure good operating conditions, the level of the fluidized bed should be maintained between an upper limit N and a lower limit N'; the pressure of injection of the gas measured in the collectors 17 and 18 is a linear function of the height of the fluidized bed so that the level of the product is maintained between these limits by arranging that the speed of the extracting belt 12 is governed by the pressure measured by a pressure gauge or pressure controller 25.

It will be understood from the foregoing descriptions that the fluidized bed 37 formed by the gas introduced laterally at the bottom of this bed 37 bears against a fixed bed 39. Product which has not yet been treated is introduced into the fluidized bed 37, preferably at its upper end, this introduced product being itself fluidized in the bed 37 which feeds the fixed bed 39 at the rate of the withdrawal by the extracting belt 12.

Figure 2:
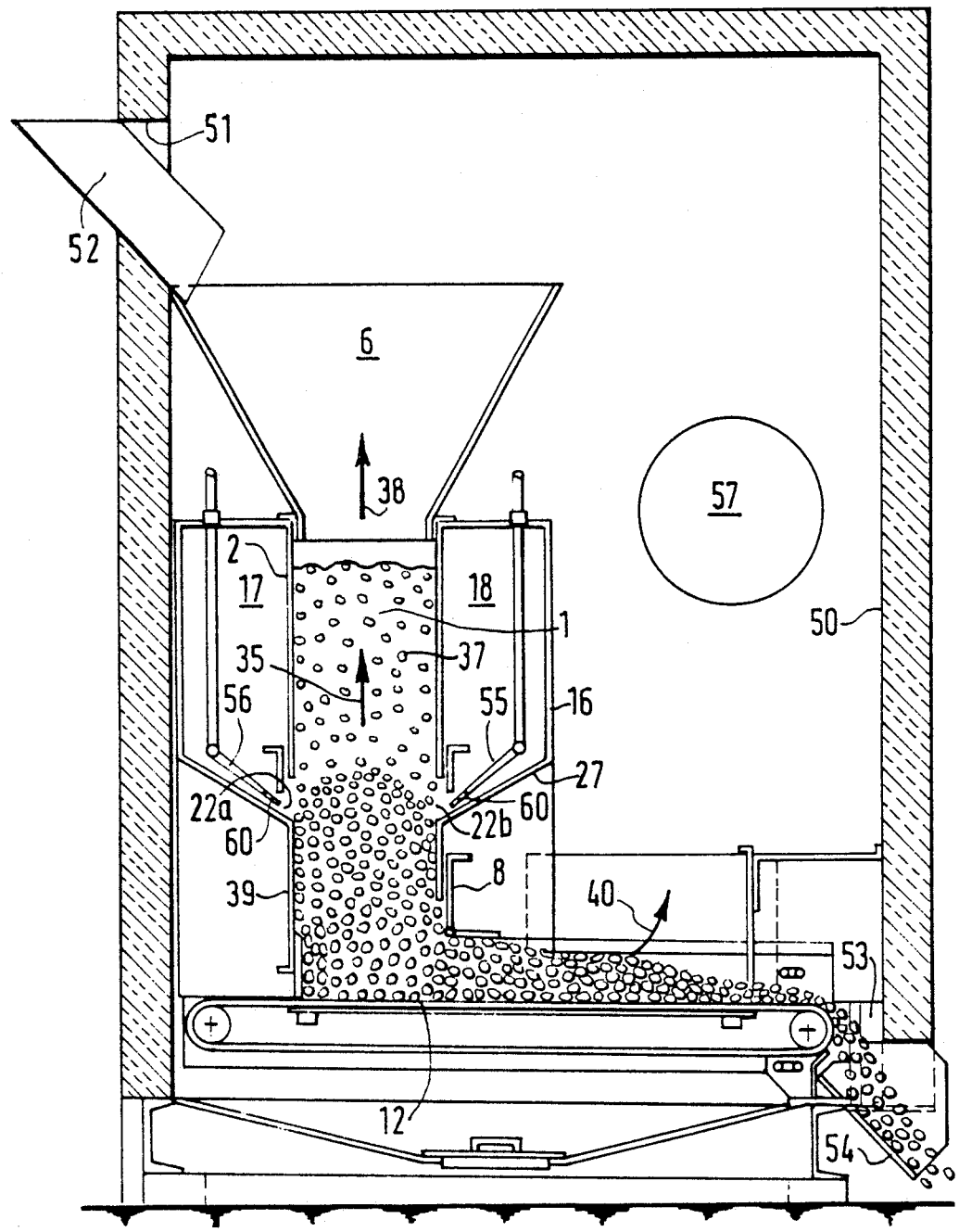
FIGS. 2 and 3 are respectively a vertical cross-sectional view of the treating chamber and a partial vertical longitudinal section al view of the treating chamber.
Figure 3:
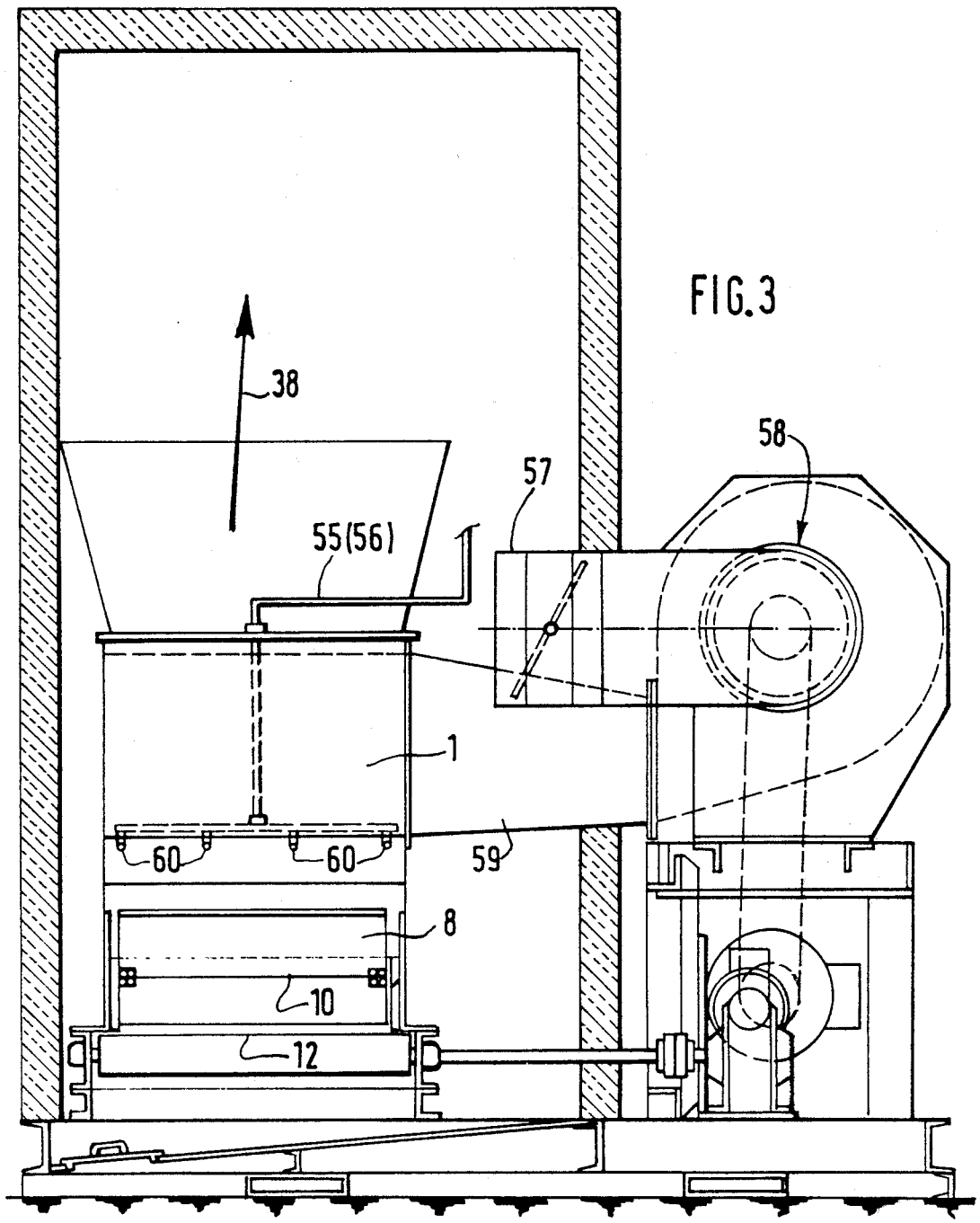

FIGS. 2 and 3 represent an installation of the type described with reference to FIG. 1 (the same reference numerals are employed for designating the same component parts), adapted to ensure the deep freezing of peas. Here the chamber 1 such as that described with reference to FIG. 1 is placed in a thermal insulating enclosure 50 having an opening 51 for the passage of a supply short 52 leading to the hopper 6, and another opening 53 provided with another pouring shoot 54 in the region of the output end of the extracting belt 12. Further, for the purpose of supplying cold, a double series of spraying tubes 55, 56 are provided which terminate in nozzles 60 along the slots 22a and 22b, the tubes being connected by a general supply tube (not shown) to a reservoir of cryogenic fluid, liquid nitrogen or carbon dioxide under pressure. The cold gas currents 35 travelling through the hopper 12 and 40 and issuing from the fixed bed 39 are taken up by the aspiration inlet 57 of a fan 58 and are recycled through a large duct 59 to the lateral collectors 17 and 18.

The dimensions of the ports 22a and 22b is so arranged that the gas, when passing therethrough, is injected at such velocity that its distribution is correct on a horizontal section of the chamber. The vertical dimensions of the slots are adjustable; indeed, the slots inject into the product quasi-horizontal gas sheets and the product has a tendency to have a swirling motion whose type depends on the dimension of the slots 22a and 22b, the height of the bed above the slots, the velocity of the gas in the slots, and to a lesser extent on the size of the product.

Values of these parameters are given hereinafter by way of indication so that the layer of product is fluidized above these swirling motions:

height of the product above the slots: 400 mm
1 horizontal distance between the slots or transverse width of the bed
d vertical dimension of the slots
v practical velocity of fluidization with respect to the empty section
V velocity of the gas through a slot in the case of nitrogen at $-60°$ C. for products: corn in grains of 8 mm, peas of 6 to 7 mm, creole rice in individualized grains having a diameter of 3 mm and a width of 9 mm.

| Product | v m/s | width 1 = 250 mm | | width 1 = 300 mm | |
| --- | --- | --- | --- | --- | --- |
| | | V m/s | d mm | V m/s | d mm |
| corn | 4 | 16.7 | 30 | 20 | 25 |
| peas | 3.5 | 17.5 | 25 | 21 | 21 |
| rice | 2.5 | 17.4 | 13 | 19 | 16.5 |

The velocity V of the gas through the slot must be increased when the transverse width 1 of the bed increases, provided that the height of the bed and the transverse width 1 are in a ratio higher than or equal to 4/3.

When the height of the product is less, with everything being equal, the velocity V of the gas through the slots must be increased in order to obtain a regular fluidization.

Figure 4:
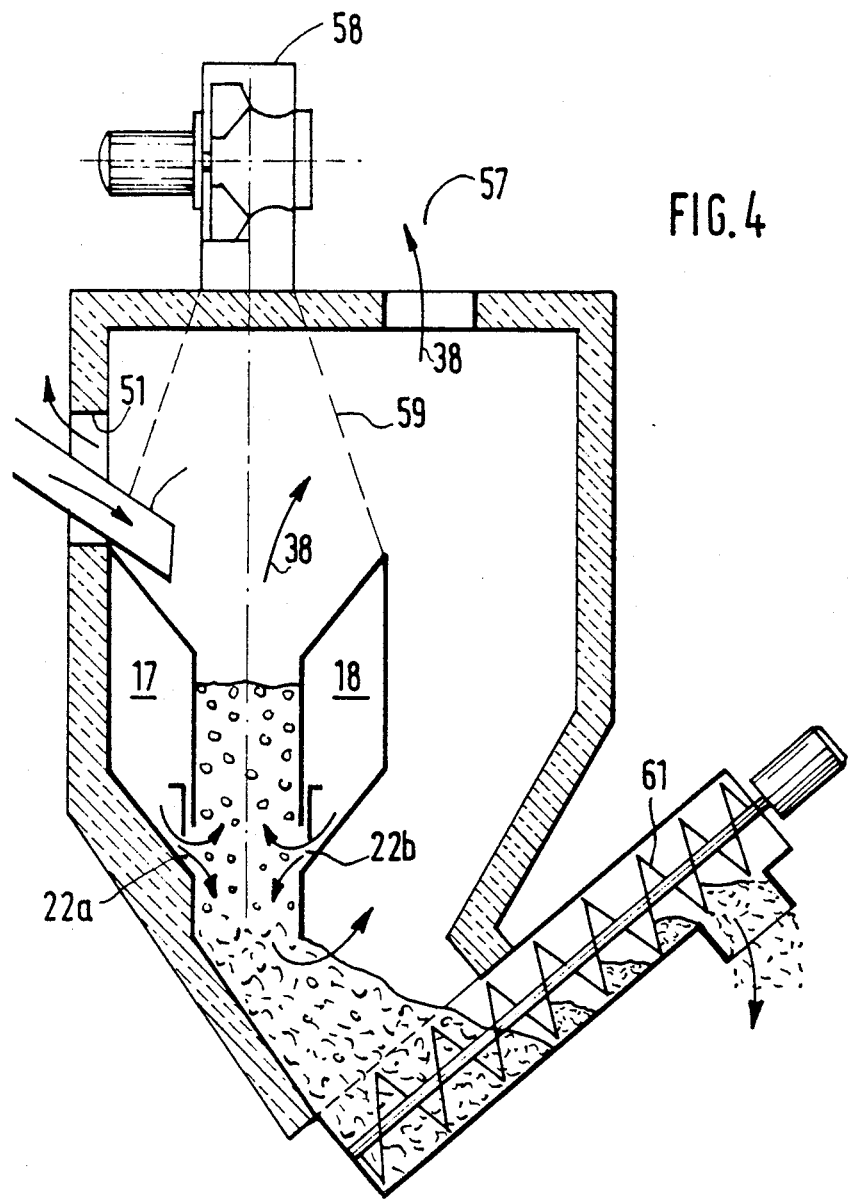
FIGS. 4, 5 and 6 are sectional views of three embodiments of the invention.

FIG. 4 represents another arrangement according to the invention in which the fixed bed is withdrawn through a conveyor screw 61 whose movement is regulated to maintain the level of the fluidized bed within the aforementioned limits.

The fan 58 is here placed in the upper part of the installation and it will be understood that products of small size or in fragments projected by the fluidized bed are either received directly by the fixed bed or reintroduced into the fluidized bed if they are aspirated by the fan.

Figure 5:
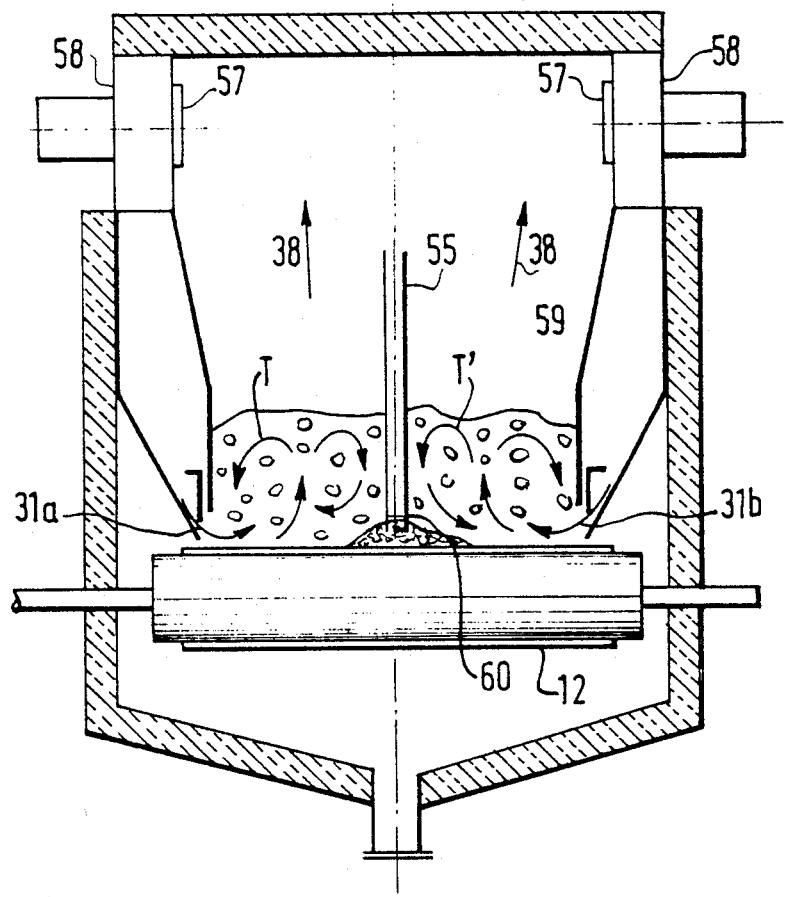

When the ratio of the height of the fluidized product above the slots 22a and 22b to the width 1 of the bed is lower than 4/3, the gas injected through the slots produces symmetrical swirls T, T' relative to the plane of symmetry of the longitudinal walls 2 and 3 and FIG. 5 shows the interest of this; the swirls T, T' cause the product to rise from the bottom of the layer to the surface while movements of the product occur from the surface toward the bottom of the layer along the walls 2 and 3 and in the median zone of the bed. It is advantageous, in the case of the deep freezing of fresh, humid and adhesive products, to supply the bed with product in the median zone, since the product will be frozen on the surface before reaching the walls 2 and 3 where it could become adhered.

The extracting belt 12 is shown in FIG. 5 on which the fixed bed of particles is reduced to a minimum; this fixed bed could be mechanically pushed by fixed ploughshares which would bring its elements into the very agitated zone of the swirls or preferably displaced by the injection of a cryogenic fluid, nitrogen or $CO_2$ through pipes 55 provided with nozzles 60 forming horizontal jets.

Two blowing fans 58 are placed above the slots 22a and 22b to permit the reintroduction of particles into the bed.

Figure 6:
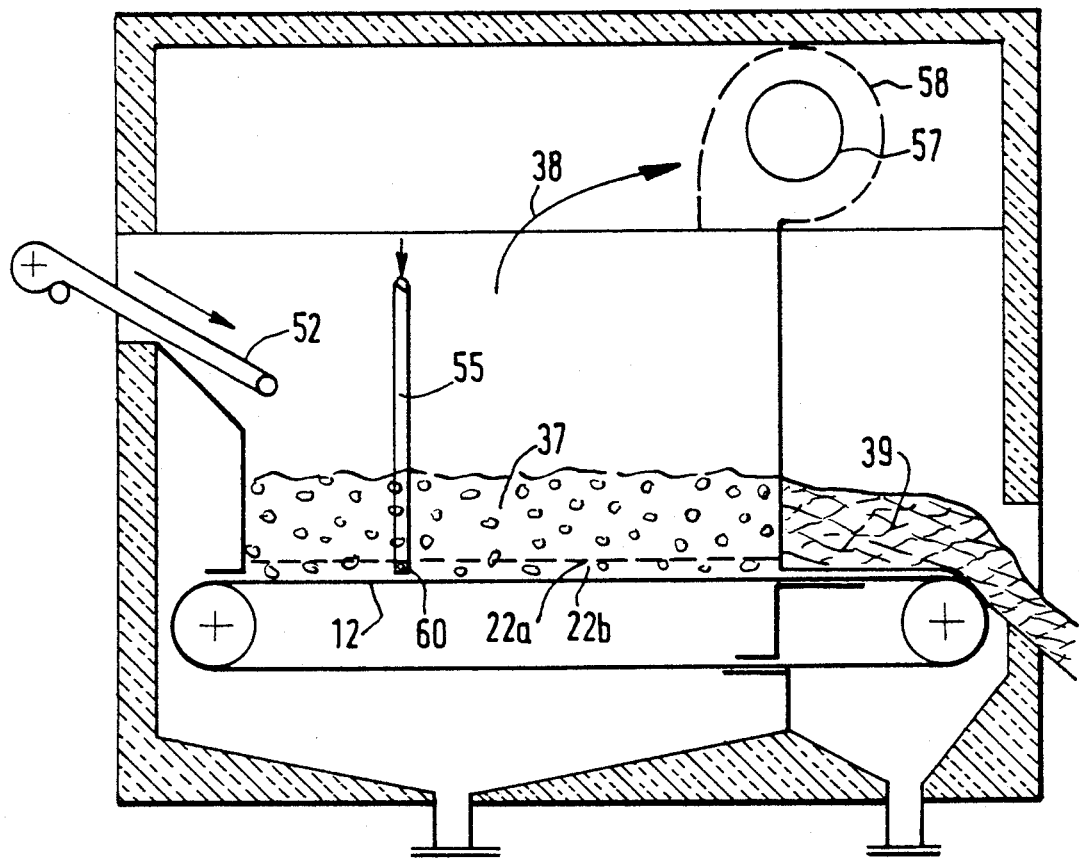

FIG. 6 shows the longitudinal section of the installation corresponding to FIG. 5; the ventilated length of the bed may be greater than that represented so as to adapt it to the desired production; at the end of the belt a non-ventilated zone corresponds to a fixed bed which maintains the mobile or fluidized bed at the desired level, the movement of the extracting belt being regulated as a function of the height of the product in process of fluidization.

What is claimed is:

1. Process for treating a product subdivided into particulate elements or grains, employing a fluidized bed of said particulate elements produced by an injected fluidization gas in a chamber open in an upper part thereof and having a bottom, said process comprising injecting fluidization gas through lateral inlet ports which are in facing relation to each other in pairs and located at a distance from said chamber bottom so as to form at least two currents which are convergent toward each other for producing a principal ascending recomposition current for fluidizing said particulate elements and an auxiliary recomposition current flowing through a substantially fixed bed of said particulate elements and escaping from the chamber through an opening in a low position in the chamber.

2. Treating process according to claim 1, wherein the auxiliary current is in the descending direction through the fixed bed which forms a support for the fluidized bed.

3. Treating process according to claim 1, comprising ensuring a continuous supply of particulate elements to be treated at the level of said fluidized bed and continuous withdrawal of treated particulate elements at the level of said fixed bed.

4. Treating process according to claim 1, comprising withdrawing the treated product at a rate which is governed by the injection pressure of the gas.

5. Treating process according to claim 1, applied to the cooling of a product, comprising placing the chamber in a thermal insulating enclosure and recirculating in said enclosure the gas escaping at the top of the fluidized bed and at the bottom of the fixed bed to said injection inlet ports, while adding to the recirculation gas a cryogenic agent.

6. Treating process according to claim 5, wherein said coolling is a deep freezing of food product.

7. Treating process according to claim 5, wherein said cryogenic agent is selected from a group consisting of sprayed liquid nitrogen and carbon dioxide snow.

8. Treating process for cooling a product according to claim 5, comprising maintaining the level of the fluidized bed between fixed values by a controlled extraction of the fixed bed by conveyor means.

9. Treating process according to claim 8, wherein said conveyor means is a belt.

10. Installation for treating a product in a subdivided state, comprising a chamber having vertical walls and a bottom and open at an upper end of the chamber and provided with lateral inlet ports for the injection of a fluidization gas located at a distance from the bottom of the chamber and in facing relation to each other in pairs, and means for injecting fluidization gas through the inlet ports to produce two oppositely directed gas current within the chamber, one of said currents flowing in a generally downward direction and the other current flowing upwardly to fluidize the divided product.

11. Treating installation according to claim 10, wherein the ports are in the form of slots.

12. Treating installation according to claim 11, comprising a fan placed above the level of the gas injection slots, and means for adjusting the width of said slots.

13. Product treating installation according to claim 10, comprising means provided at a lower end of the chamber for withdrawing the treated product and means provided above the ports for supplying product to be treated.

14. Product treating installation according to claim 10, wherein the chamber has a rectangular parallelepipedic shape, the ports being provided in two opposed lateral sides of the chamber.

15. Product treating installation according to claim 13, comprising means for controlling the withdrawings means by the pressure of the gas injected through the ports.

16. An installation according to claim 10 which further comprising, in combination, a thermal insulating enclosure enclosing the chamber, and means for injecting cyrogenic fluid into the fluidization gas.

17. An installation according to claim 16, in which the cryogenic fluid is injected at the level of the lateral inlet ports.

* * * * *